United States Patent
Omori et al.

(10) Patent No.: US 11,489,975 B2
(45) Date of Patent: **\*Nov. 1, 2022**

(54) INFORMATION PROCESSING DEVICE FOR CALCULATING A CONTACT ANGLE AND COMPUTER READABLE MEDIUM FOR THE SAME

(71) Applicant: FUJIFILM Business Innovation Corp., Tokyo (JP)

(72) Inventors: Masao Omori, Kanagawa (JP); Eizo Kurihara, Ebina (JP); Ryosuke Takahashi, Kanagawa (JP); Kenji Akahane, Kanagawa (JP); Yasuhiro Otsuka, Yokohama (JP)

(73) Assignee: FUJIFIIM Business Innovation Corp., Tokyo (JP)

( * ) Notice: Subject to any disclaimer, the term of this patent is extended or adjusted under 35 U.S.C. 154(b) by 82 days.

This patent is subject to a terminal disclaimer.

(21) Appl. No.: 16/942,884

(22) Filed: Jul. 30, 2020

(65) Prior Publication Data
US 2021/0281688 A1   Sep. 9, 2021

(30) Foreign Application Priority Data
Mar. 3, 2020   (JP) .............................. JP2020-036289

(51) Int. Cl.
*H04N 1/00*   (2006.01)
*B41J 25/00*  (2006.01)

(52) U.S. Cl.
CPC .......... *H04N 1/00092* (2013.01); *B41J 25/00* (2013.01); *H04N 1/00037* (2013.01); *H04N 1/00068* (2013.01)

(58) Field of Classification Search
None
See application file for complete search history.

(56) References Cited

FOREIGN PATENT DOCUMENTS

| JP | 2003-232712 | | 8/2003 |
|----|-------------|---|--------|
| JP | 2003329629 A | * | 11/2003 |
| JP | 2005305826 A | * | 11/2005 |
| JP | 2007-108007 | | 4/2007 |
| JP | 2010-054312 | | 3/2010 |

OTHER PUBLICATIONS

English language machine translation of JP 2007-108007.
English language machine translation of JP 2003-232712.
English language machine translation of JP 2010-054312.

* cited by examiner

*Primary Examiner* — Andrew H Lam
(74) *Attorney, Agent, or Firm* — Fildes & Outland, P.C.

(57) ABSTRACT

An information processing device includes a processor configured to acquire a first characteristic value indicating a shape characteristic of a surface of a medium, and calculate, based on the first characteristic value, a contact angle of a droplet with respect to the medium.

16 Claims, 10 Drawing Sheets

INFORMATION PROCESSING DEVICE FOR CALCULATING A CONTACT ANGLE AND COMPUTER READABLE MEDIUM FOR THE SAME

CROSS-REFERENCE TO RELATED APPLICATIONS

This application is based on and claims priority under 35 USC 119 from Japanese Patent Application No. 2020-36289 filed on Mar. 3, 2020.

BACKGROUND

Technical Field

The present invention relates to an information processing device and a computer readable medium.

Related Art

JP-A-2007-108007 discloses a contact angle measurement method. In the contact angle measurement method in JP-A-2007-108007, when measuring, by image processing, a value of a contact angle after a droplet is dropped on a sample, a contact angle θ over time is measured, and based on the obtained value, an approximate straight line is created in coordinates with an elapsed time t after dropping as the horizontal axis and the contact angle θ as the vertical axis. Further, a unit for calculating an intercept of the approximate straight line as a contact angle value θs, from which the surface energy of the sample may be evaluated, is provided.

JP-A-2003-232712 discloses a contact angle and surface shape compound measurement device. The contact angle and surface shape compound measurement device in JP-A-2003-232712 includes a droplet dropping unit, a shape measurement unit, a position control unit, and a computer. The droplet dropping unit drops a droplet at a desired position on the surface of the sample. The shape measurement unit measures a three-dimensional shape of the surface of the sample and a droplet shape by using a non-contact optical method. The position control unit relatively displaces positions of the droplet dropping unit and the shape measurement unit with respect to the sample. The computer controls operations of the droplet dropping unit, the shape measurement unit, and the position control unit, acquires position information and image information, and calculates the contact angle based on the droplet shape.

JP-A-2010-54312 discloses a contact angle measurement method for a droplet on a sample. In the contact angle measurement method in JP-A-2010-54312, first, a region where the contact angle of the droplet on the sample may be optically measured is taken as a reference region, and a cantilever of a scanning probe microscope is used to measure an adhesion force from a force curve acting between a probe tip of the cantilever and the sample in the reference region on the sample. Next, an optical microscope is used to observe, from a side surface, the droplet dropped on the reference region, and the contact angle with respect to the reference region is measured. A relational expression between the adhesion force and the contact angle is obtained in advance based on the adhesion force of the reference region, the contact angle with respect to the reference region, and the Young's equation. Next, the adhesion force is measured from the force curve acting between the probe tip of the cantilever and the sample in the region where the contact angle on the sample is to be measured. Finally, the value of the adhesion force of the region to be measured is inserted into the relational expression to obtain the contact angle with respect to the region to be measured.

SUMMARY

In the case of measuring the contact angle of a liquid into a printing medium, a method is known in which a droplet is actually dropped on a printing medium and the result is analyzed using a laser light irradiation device, a laser light source, and a probe (such as an electrical conductivity sensor, a friction sensor, or a gas sensor).

However, since the above laser light irradiation device or the like is large and expensive, it is difficult to easily measure the above contact angle.

Aspects of non-limiting embodiments of the present disclosure relate to providing an information processing device and a non-transitory computer readable medium storing a program for easily calculating a contact angle of a liquid with respect to a printing medium as compared with the case of actually dropping a droplet and using a laser light irradiation device or the like.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including: a processor, wherein the processor is configured to acquire a first characteristic value indicating a shape characteristic of a surface of a medium, and calculate, based on the first characteristic value, a contact angle of a droplet with respect to the medium.

BRIEF DESCRIPTION OF DRAWINGS

Exemplary embodiment(s) of the present invention will be described in detail based on the following figures, wherein.

DETAILED DESCRIPTION

Hereinafter, an exemplary embodiment of a droplet contact angle calculation device, which is an example of an information processing device according to the present invention, will be described.

(Configuration of Droplet Contact Angle Calculation Device ESS)

Figure 1:
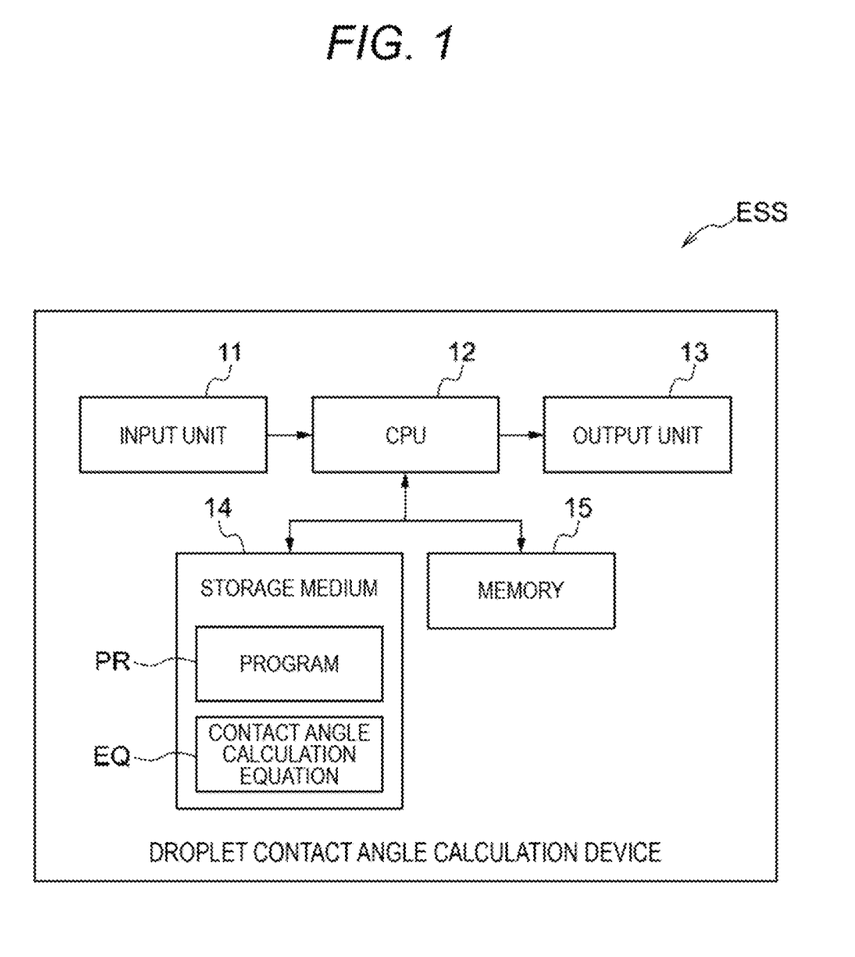
FIG. 1 shows a configuration of a droplet contact angle calculation device ESS according to an exemplary embodiment.

FIG. 1 shows a configuration of the droplet contact angle calculation device ESS according to the exemplary embodiment. Hereinafter, the configuration of the droplet contact angle calculation device ESS according to the exemplary embodiment will be described with reference to FIG. 1.

As shown in FIG. 1, the droplet contact angle calculation device ESS according to the exemplary embodiment includes an input unit 11, a central processing unit (CPU) 12, an output unit 13, a storage medium 14, and a memory 15.

The input unit 11 includes, for example, a sensor, a photodiode, a keyboard, a mouse, and a touch panel. The CPU 12 is an example of a processor, and is a core of a well-known computer which operates hardware according to software. The output unit 13 includes, for example, a light emitting diode, a printer, a liquid crystal monitor, and a touch panel. The storage medium 14 includes, for example, a hard disk drive (HDD), a solid state drive (SSD), and a read only memory (ROM). The memory 15 includes, for example, a dynamic random access memory (DRAM) and a static random access memory (SRAM).

The storage medium 14 stores a program PR and a contact angle calculation equation EQ.

The program PR is an instruction group for defining the content of a processing that the CPU 12 should execute.

The contact angle calculation equation EQ is an equation for calculating the contact angle.

Here, the "contact angle" refers to an angle formed by the surface of the droplet with respect to a surface of a printing medium PM (for example, shown in FIG. 4) such as paper, which is an example of a "medium".

The contact angle calculation equation EQ is expressed as follows.

$$\text{Contact angle } SSK = A \times \text{brightness statistic } KT + B \times \text{electrical resistance value } DT + C \times \text{infrared absorption amount } SK1/\text{infrared absorption amount } SK2 + D \quad (1)$$

The "brightness statistic KT" refers to a smoothness HD of the surface of the printing medium PM (to be described later with reference to FIG. 4, FIG. 5A, and FIG. 5B).

The "brightness statistic KT" is an example of a "first characteristic value" indicating a "shape characteristic" of the surface of the printing medium PM.

The "electrical resistance value DT" (log $\Omega$) is indicated as a common logarithm value of a resistance value per unit length of the surface of the printing medium PM.

The "infrared absorption amount SK1" refers to the amount of infrared lights absorbed by the surface of the printing medium PM when the surface of the printing medium PM is irradiated with an infrared light having a wavelength of 1400 nm.

The "infrared absorption amount SK2" refers to the amount of infrared lights absorbed by the surface of the printing medium PM when the surface of the printing medium PM is irradiated with an infrared light having a wavelength of 1250 nm. Each of the "infrared absorption amount SK1" and "infrared absorption amount SK2" is calculated as a ratio of an actual amount of received light to an amount of received light in a case where the infrared lights irradiated are reflected by 100 percent. The case where the infrared lights irradiated are reflected by 100 percent corresponds to a case where no infrared lights irradiated are absorbed.

The "electrical resistance value DT", the "infrared absorption amount SK1", and the "infrared absorption amount SK2" are examples of a "second characteristic value" indicating a "physical characteristic" of the surface of the printing medium PM.

The reason of using the infrared light having both wavelengths of 1250 nm and 1400 nm is as follows. By using the former wavelength of 1250 nm, the infrared absorption amount may be measured regardless of the material of the printing medium PM. Therefore, the infrared absorption amount obtained by the measurement using the former wavelength of 1250 nm may be used as a reference amount (reference value), and the infrared absorption amount obtained by the measurement using the latter wavelength of 1400 nm may be calibrated.

The "constant A", "constant B", and "constant C" are experimentally obtained constants for conversion that are used to obtain the contact angle SSK of the printing medium PM, based on the brightness statistic KT, the electrical resistance value DT, and the infrared absorption amounts SK1 and SK2 of the printing medium PM whose contact angle SSK is to be predicted.

The "constant A", "constant B", and "constant C" are numerical values specified in advance by, for example, an experimenter under an environment (for example, an environment using a laser microscope) which is different from that of the droplet contact angle calculation device ESS and in which the measurement may be performed with higher accuracy. More specifically, the "constant A", "constant B", and "constant C" are specified to define the relationship between contact angles SSK of a plurality of printing media PM, which are different from the above "printing medium PM whose contact angle SSK is to be predicted" and are experimentally used, and brightness statistic KT, electrical resistance values DT and infrared absorption amounts SK1 and SK2 of the plurality of printing media PM.

The "constant D" is a constant for complementing the calculation when the contact angle SSK is calculated using the brightness statistic KT, the electrical resistance value DT, the infrared absorption amounts SK1 and SK2, and the constants A, B, C. Sets of the "constant A", "constant B", "constant C" and "constant D" are prepared in advance for each of the cases where all of the brightness statistic KT, electrical resistance values DT and the infrared absorption amounts SK1 and SK2 are used and where at least one of the brightness statistic KT, electrical resistance value DT and the infrared absorption amounts SK1 and SK2 are not used.

(Function of Droplet Contact Angle Calculation Device ESS)

Figure 2:
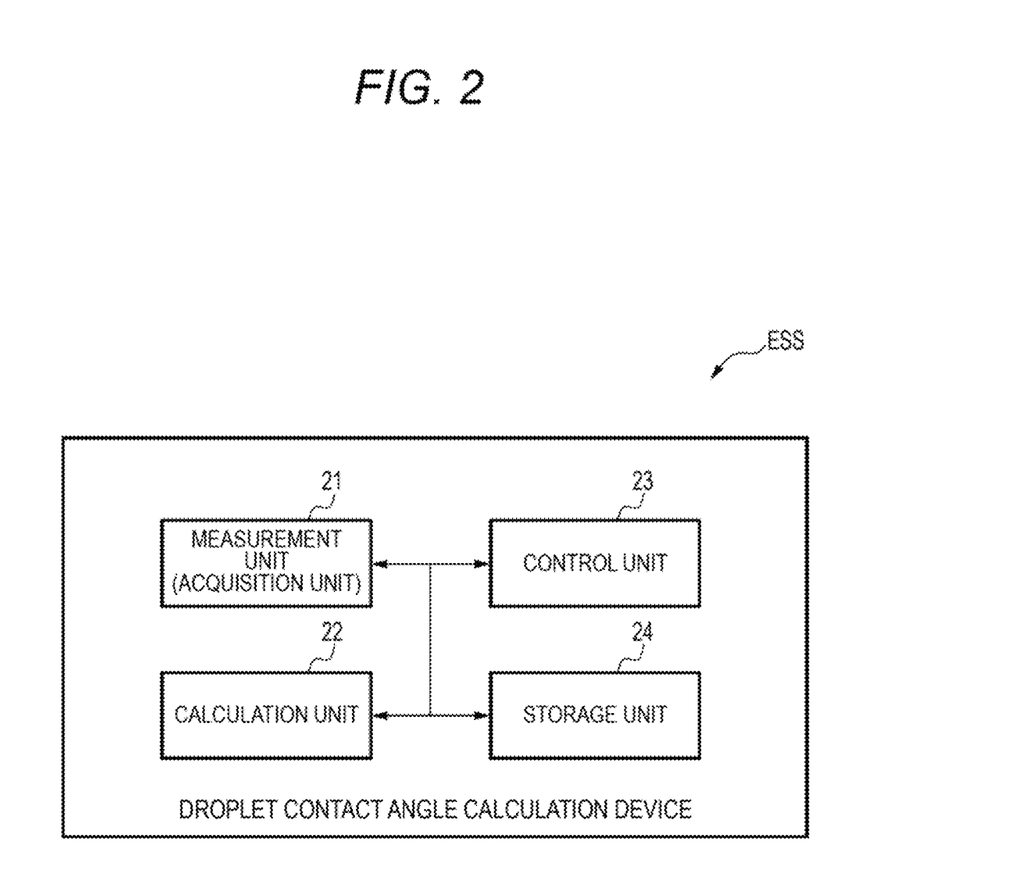
FIG. 2 is a functional block diagram of the droplet contact angle calculation device ESS according to the exemplary embodiment.

FIG. 2 is a functional block diagram of the droplet contact angle calculation device ESS according to the exemplary embodiment.

As shown in FIG. 2, the droplet contact angle calculation device ESS according to the exemplary embodiment includes a measurement unit (acquisition unit) 21, a calculation unit 22, a control unit 23, and a storage unit 24.

Regarding a relationship between a hardware configuration and a functional configuration in the droplet contact angle calculation device ESS, on the hardware, the CPU 12 executes the program PR stored in the storage medium 14 (implementing some functions of the storage unit 24) while using the memory 15 (implementing some functions of the storage unit 24), and, as the control unit 23, controls the operations of the input unit 11 and the output unit 13, as necessary. Thereby, the functions of each unit of the measurement unit 21 and the calculation unit 22 are implemented. The functions of the units will be described below.

(Unit Configuration of Droplet Contact Angle Calculation Device ESS)

Figure 3:
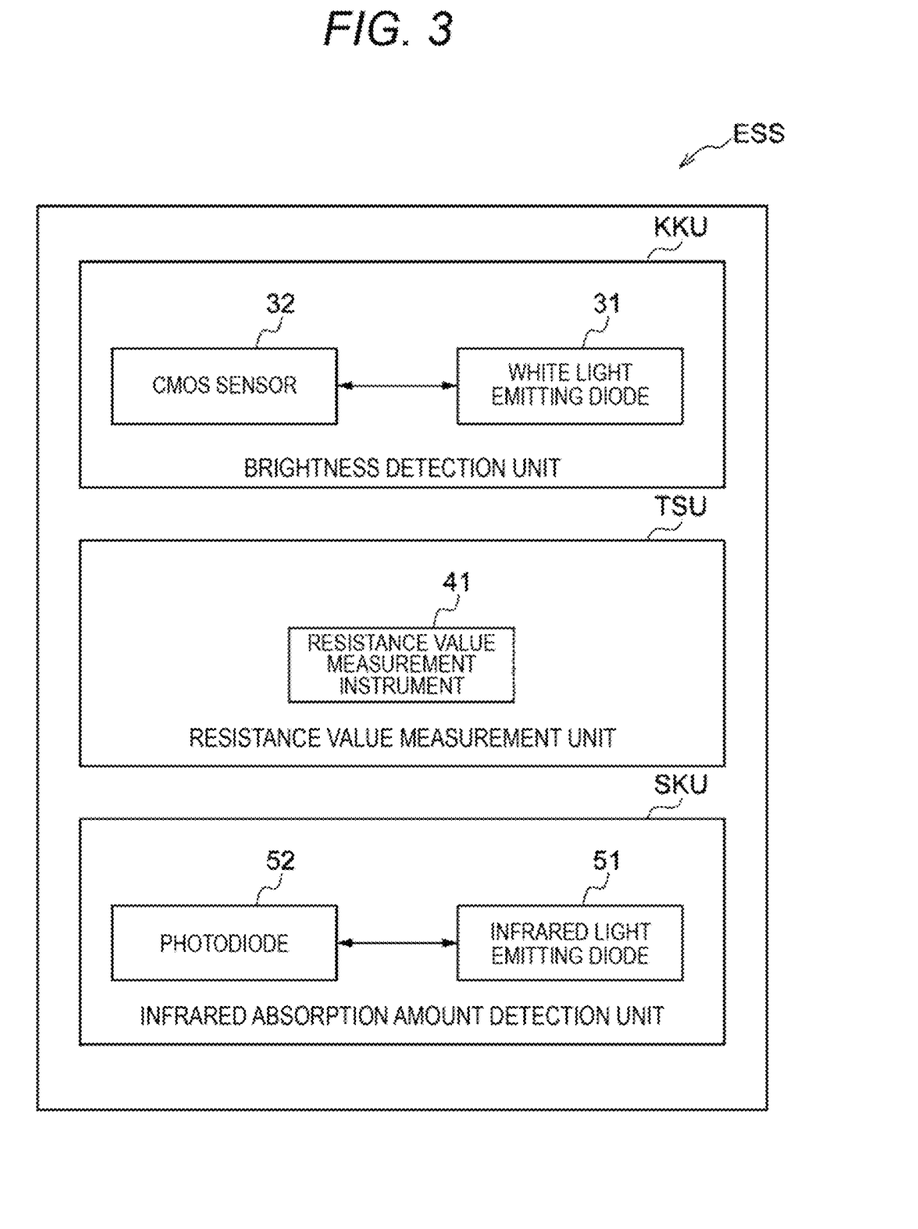
FIG. 3 shows a unit configuration of the droplet contact angle calculation device ESS according to the exemplary embodiment.

FIG. 3 shows a unit configuration of the droplet contact angle calculation device ESS according to the exemplary embodiment.

As shown in FIG. 3, the droplet contact angle calculation device ESS according to the exemplary embodiment includes three units, that is, a brightness detection unit KKU, a resistance value measurement unit TSU, and an infrared absorption amount detection unit SKU.

As shown in FIG. 3, the brightness detection unit KKU includes a white light emitting diode 31 and a CMOS sensor 32. The white light emitting diode 31 corresponds to the output unit 13 (shown in FIG. 1), and the CMOS sensor 32 corresponds to the input unit t 1 (shown in FIG. 1).

As shown in FIG. 3, the brightness detection unit KKU includes a resistance value measurement instrument 41. The resistance value measurement instrument 41 corresponds to the input unit 11 and the output unit 13.

As shown in FIG. 3, the infrared absorption amount detection unit SKU includes an infrared light emitting diode 51 and a photodiode 52. The infrared light emitting diode 51 corresponds to the output unit 13, and the photodiode 52 corresponds to the input unit 11.

(Factual Relationship Assumed by Droplet Contact Angle Calculation Device ESS According to Exemplary Embodiment)

Figure 4:
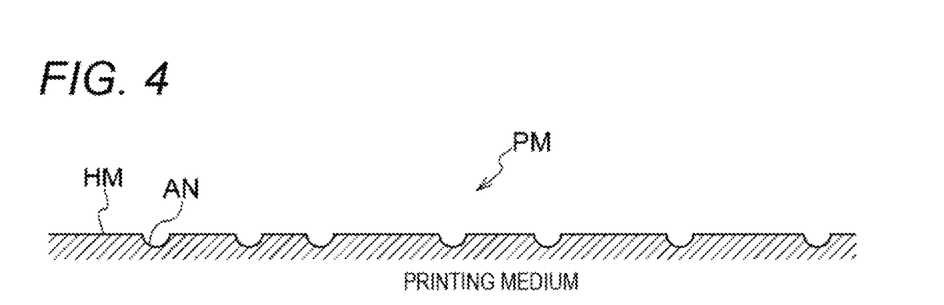
FIG. 4 is a schematic diagram showing a surface of a printing medium PM according to the exemplary embodiment.

FIG. 4 is a schematic diagram showing the surface of the printing medium PM according to the exemplary embodiment.

Figure 5A:
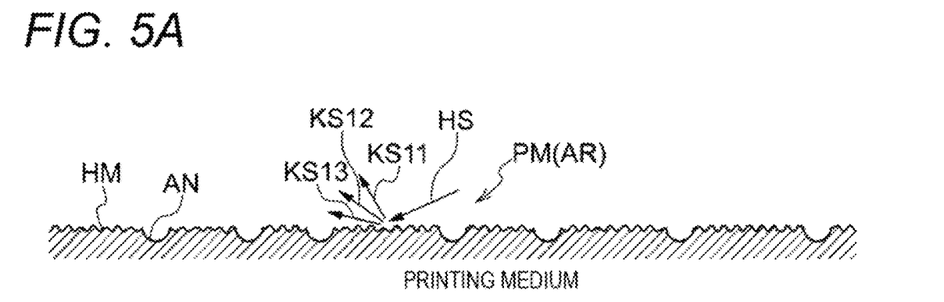
FIG. 5A is a first detailed diagram showing the surface of the printing medium PM according to the exemplary embodiment.

FIG. 5A is a first detailed diagram showing the surface of the printing medium PM according to the exemplary embodiment.

Figure 5B:
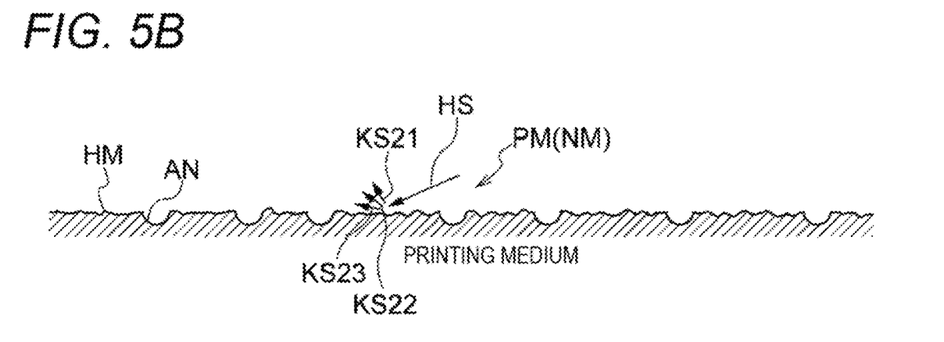
FIG. 5B is a second detailed diagram showing the surface of the printing medium PM according to the exemplary embodiment.

FIG. 5B is a second detailed diagram showing the surface of the printing medium PM according to the exemplary embodiment.

The surface of the printing medium PM has a flat surface HM and a pore AN, as shown in FIG. 4. On the surface of the printing medium PM, when comparing an area of the flat surface HM and an area of the pore AN, the area of the flat surface HM is extremely wide. Therefore, the contact angle SSK, which is the property of the surface of the printing medium PM, is determined by the property of the flat surface HM of the printing medium PM.

Hereinafter, the printing medium PM having a "rough" flat surface HM is referred to as a "printing medium PM (AR)", while the printing medium PM having a "smooth" flat surface HM is referred to as a "printing medium PM (NM)".

As shown in FIG. 5A, the flat surface HM on the surface of the printing medium PM (AR) diffusely reflects an incident white light HS to reflect diffused lights KS11, KS12, KS13 having a large light amount.

In contrast to the above, as shown in FIG. 5B, the fat surface HM on the surface of the printing medium PM (NM) diffusely reflects the emitted white light HS, but reflects diffused lights KS21, KS22, and KS23 having a small light amount.

Therefore, more specifically, the contact angle SSK of the printing medium PM is determined by the "smoothness HD", which is a degree to which the flat surface HM on the surface of the printing medium PM is rough or smooth.

(Operation of Droplet Contact Angle Calculation Device ESS According to Exemplary Embodiment)

Hereinafter, in order to facilitate the explanation and understanding, it is assumed that the printing medium PM is preset at a position where the brightness statistic KT, the electrical resistance value DT, and the infrared absorption amount SK of the printing medium PM may be measured, that is, a position where measurement and detection may be performed, in relation to the droplet contact angle calculation device ESS.

(Operation of Brightness Detection Unit KKU)

Figure 6:
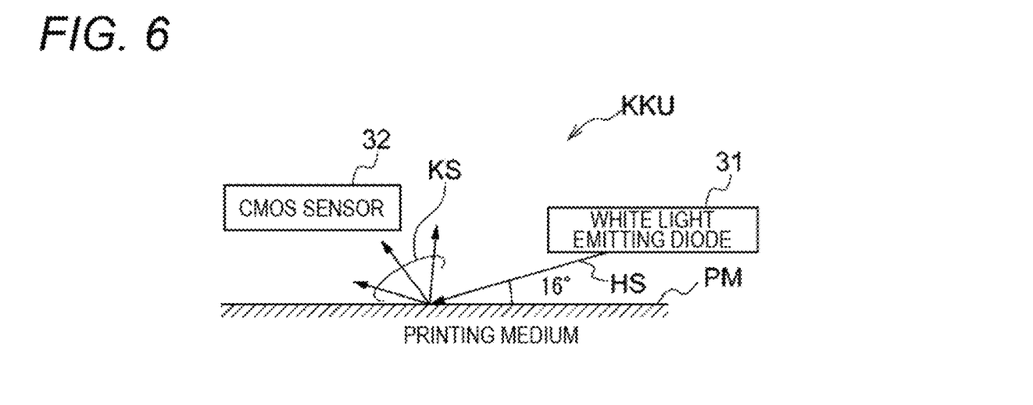
FIG. 6 is a diagram showing irradiation of a white light HS and imaging of a diffused light KS by using a brightness detection unit KKU according to the exemplary embodiment.

FIG. 6 is a diagram showing irradiation of the white light HS and imaging of the diffused light KS by using the brightness detection unit KKU according to the exemplary embodiment.

Figure 7:
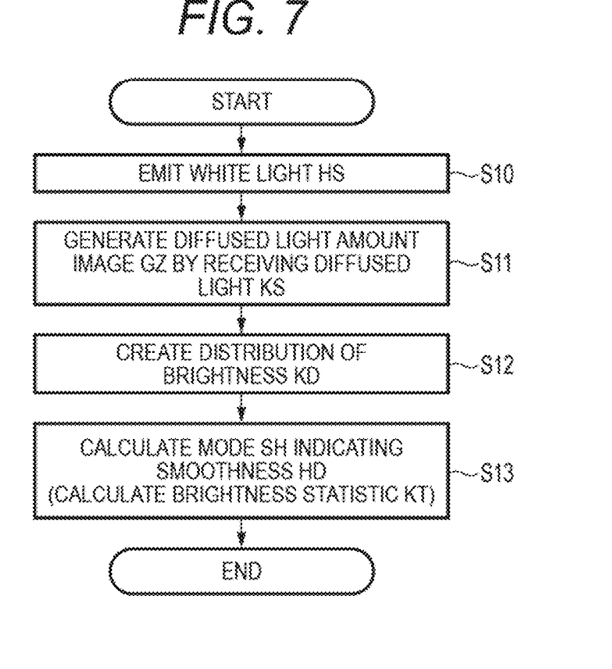
FIG. 7 is a flowchart showing an operation of the brightness detection unit KKU according to the exemplary embodiment.

FIG. 7 is a flowchart showing the operation of the brightness detection unit KKU according to the exemplary embodiment. Hereinafter, the operation of the brightness detection unit KKU according to the exemplary embodiment will be described with reference to FIG. 6 and FIG. 7 showing the operation of the brightness detection unit KKU.

Step S10: a user (not shown) of the droplet contact angle calculation device ESS presses, for example, a button (not shown) for calculating the brightness statistic KT from the input unit 11 (shown in FIG. 1) of the droplet contact angle calculation device ESS. In response to the press, in the droplet contact angle calculation device ESS, the CPU 12 (shown in FIG. 1), as the measurement unit 21 (shown in FIG. 2), starts the operation of the white light emitting diode 31, which is the output unit 13 (shown in FIG. 1). Accordingly, the white light emitting diode 31 emits the white light HS toward the printing medium PM, as shown in FIG. 6.

As shown in FIG. 6, the white light emitting diode 31 of the brightness detection unit KKU preferably irradiates the printing medium PM with the white light HS at about 16 degrees with respect to the printing medium PM.

Returning to FIG. 7, the description of the operation of the droplet contact angle calculation device ESS will be continued.

Step S11: when the white light HS is emitted in step S10, in the droplet contact angle calculation device ESS, the CPU 12, as the measurement unit 21, starts the operation of the CMOS sensor 32, which is the input unit 11 (shown in FIG. 1). Accordingly, the CMOS sensor 32 receives the diffused light KS emitted from the surface of the printing medium PM, that is, the diffused lights KS11 to KS23 (shown in FIG. 5A and FIG. 5B) and other diffused lights KS.

Figure 8:
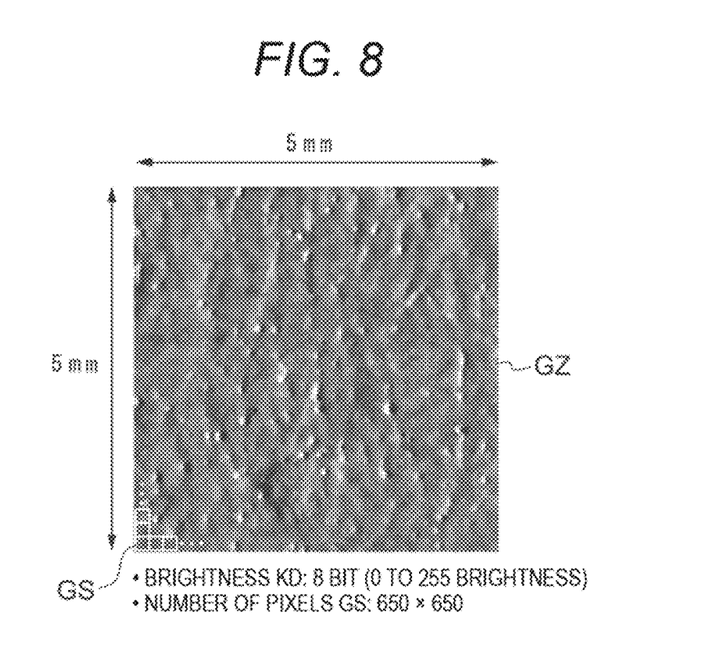
FIG. 8 shows a diffused light amount image GZ according to the exemplary embodiment.

FIG. 8 shows a diffused light amount image GZ according to the exemplary embodiment.

When the CMOS sensor 32 receives the diffused light KS, as shown in FIG. 7, the CPU 12, as the measurement unit 21, generates the diffused light amount image GZ indicating the amount of light diffused on the surface of the printing medium PM, particularly on the flat surface HM, that is, the brightness of a plurality of pixels within a unit area.

As shown in FIG. 8, as the diffused light amount image GZ, for example, a square region of 5 mm in length and width is imaged on the surface of the printing medium PM. As shown in FIG. 8, the diffused light amount image GZ is composed of, for example, 650×650 pixels GS in length and width (a total of approximately 420,000 pixels GS). Each pixel GS indicates the brightness KD of the surface of the printing medium PM, in other words, the intensity of the amount of diffused light KS in 8 bits (256 levels from 0 to 255).

Returning to FIG. 7, the description of the operation of the droplet contact angle calculation device ESS will be continued.

Step S12: when the diffused light amount image GZ is generated in step S11, the CPU 12, as the measurement unit 21, creates a distribution diagram BPZ showing a distribution of the brightness KD on the surface of the printing medium PM.

Figure 9:
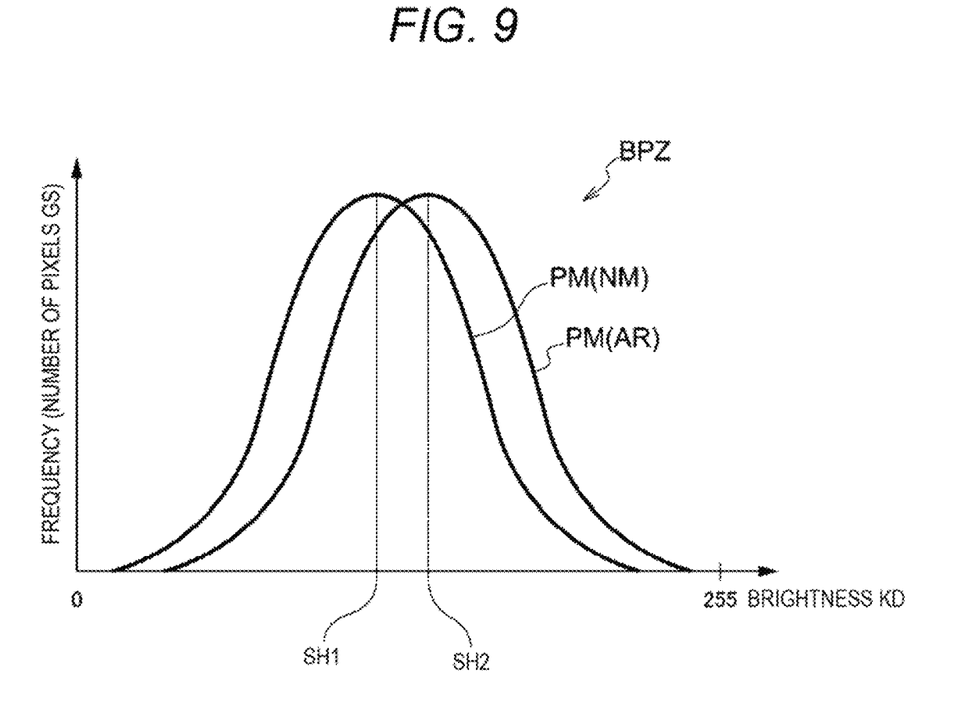
FIG. 9 shows a distribution diagram BPZ according to the exemplary embodiment.

FIG. 9 shows the distribution diagram BPZ according to the exemplary embodiment.

More specifically, as shown in FIG. 9, the CPU 12 creates the distribution diagram BPZ showing a relationship between plural pixels GS (about 420,000) included in the diffused light amount image GZ (shown in FIG. 8) and the brightness KD shown by each pixel GS. As shown in FIG. 9, the distribution diagram BPZ shows that the relationship between the brightness KD and the frequency (the number of pixels GS) approximates a normal distribution.

Here, when the distribution diagram BPZ is created for both the printing medium PM (AR) (shown in FIG. 5A) and the printing medium PM (NM)(shown in FIG. 5B), as shown in FIG. 9, a most frequent brightness value SH2 of the brightness value (the number of pixels GS) of the former printing medium PM (AR) is larger than a most frequent brightness value SH1 of the brightness value (the number of pixels GS) of the latter printing medium PM (NM).

The reason why the most frequent brightness value SH2 is larger than the most frequent brightness value SH1 is that, as shown in FIG. 5A and FIG. 5B, the amount of the diffused lights KS11, KS12, KS13 on the flat surface HM on the printing medium PM (AR) is larger than the amount of the diffused lights KS21, KS22, KS23 on the flat surface HM on the printing medium PM (NM).

In summary, when the position of the most frequent brightness value SH of the printing medium PM whose contact angle SSK is not clear is obtained, the "smoothness HD" indicating the rough or smooth degree of the flat surface HM on the surface of the printing medium PM is obtained, and accordingly the contact angle SSK becomes clear.

Returning to FIG. 7, the description of the operation of the droplet contact angle calculation device ESS will be continued.

Step S13: when the distribution diagram BPZ of the brightness KD is created in step S12, the CPU 12, as the calculation unit 22 (shown in FIG. 2), obtains the most frequent brightness value SH which is the brightness KD having the largest number of pixels GS in the distribution diagram BPZ. Accordingly, the CPU 12 calculates the brightness statistic KT.

(Operation of Resistance Value Measurement Unit TSU)

Figure 10:
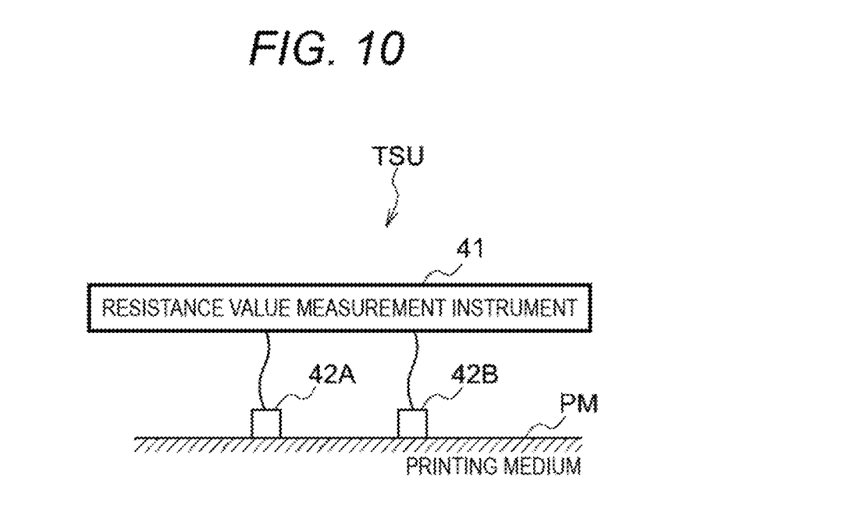
FIG. 10 is a diagram showing measurement of a resistance value by using a resistance value measurement unit TSU according to the exemplary embodiment.

FIG. 10 is a diagram showing measurement of the resistance value by using the resistance value measurement unit TSU according to the exemplary embodiment.

Figure 11:
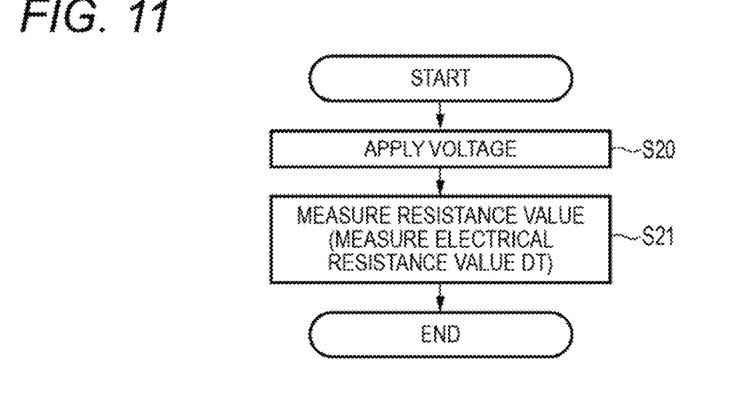
FIG. 11 is a flowchart showing an operation of the resistance value measurement unit TSU according to the exemplary embodiment.

FIG. 11 is a flowchart showing the operation of the resistance value measurement unit TSU according to the exemplary embodiment.

Hereinafter, the operation of the resistance value measurement unit TSU according to the exemplary embodiment will be described with reference to FIG. 10 and FIG. 11 showing the operation of the resistance value measurement unit TSU.

Step S20: the user of the droplet contact angle calculation device ESS presses, for example, a button (not shown) for calculating the electrical resistance value DT from the input unit 11 (shown in FIG. 1) of the droplet contact angle calculation device ESS. In response to the press, in the droplet contact angle calculation device ESS, the CPU 12 (shown in FIG. 1), as the measurement unit 21 (shown in FIG. 2), starts the operation of the resistance value measurement instrument 41, which is the output unit 13 (shown in FIG. 1). Accordingly, the resistance value measurement instrument 41 applies a voltage between two electrodes 42A and 42B on the printing medium PM.

Here, since the electrical resistance value DT of the printing medium PM is extremely large, it is desirable that a distance between the two electrodes 42A and 42B is, for example, about 1 mm, and the applied voltage is about several hundreds of V or more (for example, 200 V).

Step S21: when a voltage is applied between the two electrodes 42A and 42B in step S20, the CPU 12, as the measurement unit 21 (shown in FIG. 2), instructs the resistance value measurement instrument 41 to measure the resistance value of the printing medium PM, that is, the electrical resistance value DT. Accordingly, the resistance value measurement instrument 41 measures the electrical resistance value DT of the printing medium PM.

(Operation of Infrared Absorption Amount Detection Unit SKU)

Figure 12:
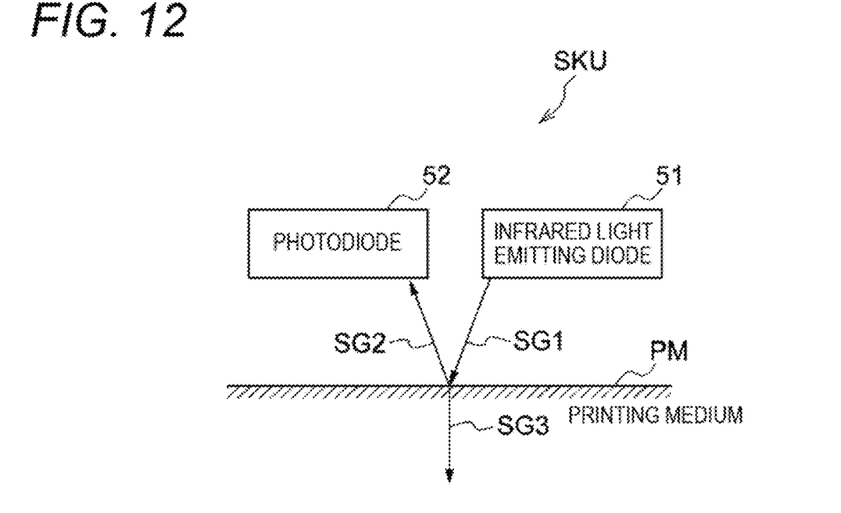
FIG. 12 is a diagram showing measurement of an infrared absorption amount SK by using an infrared absorption amount detection unit SKU according to the exemplary embodiment.

FIG. 12 is a diagram showing measurement of the infrared absorption amount SK by using the infrared absorption amount detection unit SKU according to the exemplary embodiment.

Figure 13:
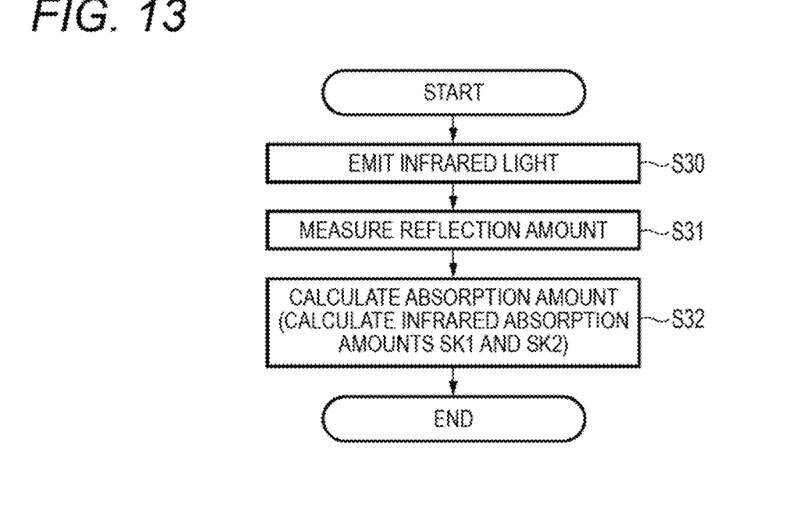
FIG. 13 is a flowchart showing an operation of the infrared absorption amount detection unit SKU according to the exemplary embodiment.

FIG. 13 is a flowchart showing an operation of the infrared absorption amount detection unit SKU according to the exemplary embodiment.

Hereinafter, the operation of the infrared absorption amount detection unit SKU according to the exemplary embodiment will be described with reference to FIG. 12 and FIG. 13 showing the operation of the infrared absorption amount detection unit SKU.

Step S30: the user of the droplet contact angle calculation device ESS presses, for example, a button (not shown) for calculating the infrared absorption amount SK from the input unit 11 (shown in FIG. 1) of the droplet contact angle calculation device ESS. In response to the press, in the droplet contact angle calculation device ESS, the CPU 12 (shown in FIG. 1), as the measurement unit 21 (shown in FIG. 2), starts the operation of the infrared light emitting diode 51, which is the output unit 13 (shown in FIG. 1). Accordingly, the infrared light emitting diode 51 emits an infrared light SG toward the surface of the printing medium PM.

Step S31: when the infrared light SG1 is emitted toward the surface of the printing medium PM in step S30, the CPU 12, as the measurement unit 21, instructs the operation of the photodiode 52 which is the input unit 11 (shown in FIG. 1), and, for example, switches a circuit wiring between the CPU 12 and the photodiode 52 such that the detection result of the photodiode 52 is fed back to the CPU 12. Accordingly, the photodiode 52 measures the amount of an infrared light SG2 reflected on the surface of the printing medium PM, that is, an reflection amount.

Step S32: when the reflection amount of the infrared light SG2 is measured in step S31, the CPU 12, as the calculation unit 22 (shown in FIG. 2), subtracts the reflection amount of the infrared light SG2 measured by the photodiode 52 in step S31 from the amount of the infrared light SG1 emitted from the infrared light emitting diode 51 in step S30. Accordingly, the CPU 12 calculates the amount (absorption amount) of an infrared light SG3 absorbed by the surface of the printing medium PM, that is, the infrared absorption amounts SK1 and SK2.

The infrared absorption amount is measured for two sets with the above steps S30 to S32 as one set. In the first set, the above 1400 nm is used as the wavelength of the infrared light SG1. In the second set, the above 1250 nm is used as the wavelength of the infrared light SG2.

(Calculation of Contact Angle SSK)

Figure 14:
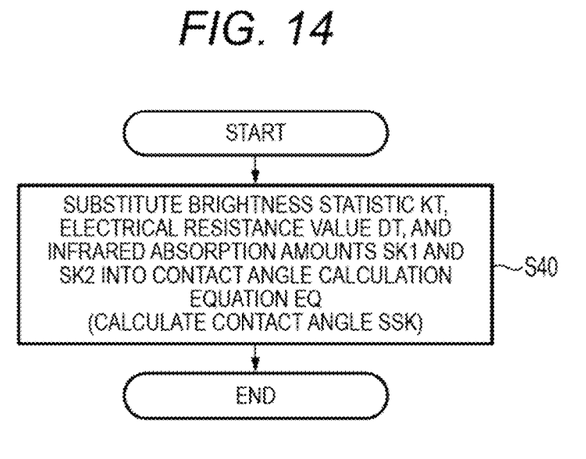
FIG. 14 is a flowchart showing calculation of a contact angle SSK by using the droplet contact angle calculation device ESS according to the exemplary embodiment.

FIG. 14 is a flowchart showing calculation of the contact angle SSK by using the droplet contact angle calculation device ESS according to the exemplary embodiment. Hereinafter, the calculation of the contact angle SSK will be described with reference to the flowchart of FIG. 14.

In Step S40, in the droplet contact angle calculation device ESS, the CPU 12 (shown in FIG. 1), as the calculation unit 22 (shown in FIG. 2), substitutes the brightness statistic KT calculated in step S13, the electrical resistance value DT measured in step S21, and the infrared absorption amounts SK1 and SK2 calculated in step S32 into the contact angle calculation equation EQ. Accordingly, the contact angle SSK is calculated.

The CPU 12 outputs the calculated contact angle SSK to the output unit 13 (shown in FIG. 2) such as a printer or a liquid crystal monitor, in response to a request from the user of the droplet contact angle calculation device ESS.

More specifically, the CPU 12 may make the following substitutions:

(1) When only the brightness statistic KT is calculated, only the brightness statistic KT is substituted into the contact angle calculation equation EQ.

(2) When the brightness statistic KT is calculated and the electrical resistance value DT is measured, the brightness statistic KT and the electrical resistance value DT are substituted into the contact angle calculation equation EQ.

(3) When the brightness statistic KT and the infrared absorption amounts SK1 and SK2 are calculated, the brightness statistic KT and the infrared absorption amounts SK1 and SK2 are substituted into the contact angle calculation equation EQ.

(4) When the electrical resistance value DT is measured and the infrared absorption amounts SK1 and SK2 are calculated, the electrical resistance value DT and the infrared absorption amounts SK1 and SK2 are substituted into the contact angle calculation equation EQ.

(Comparison between Predicted Value of Contact Angle Calculated from Contact Angle Calculation Equation EQ and True Value of Contact Angle)

Figure 15:
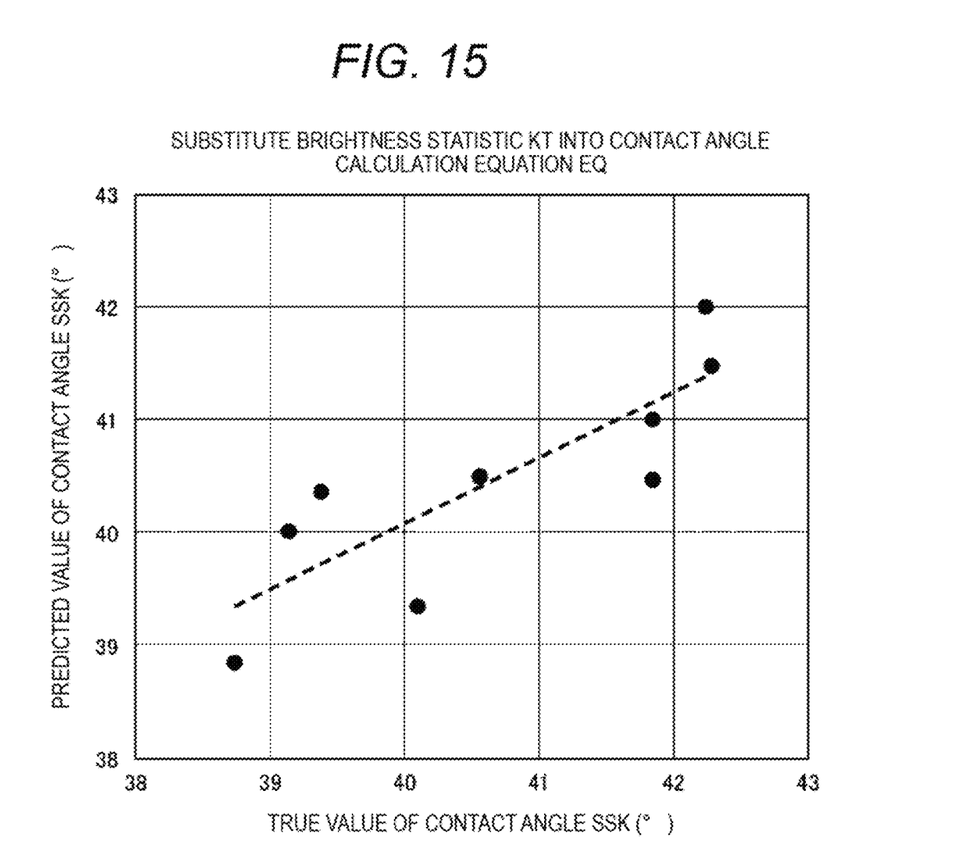
FIG. 15 shows a first relationship between a predicted value and a true value of the contact angle SSK according to the exemplary embodiment.

FIG. 15 shows a first relationship between a predicted value and a true value of the contact angle SSK according to the exemplary embodiment.

Figure 16:
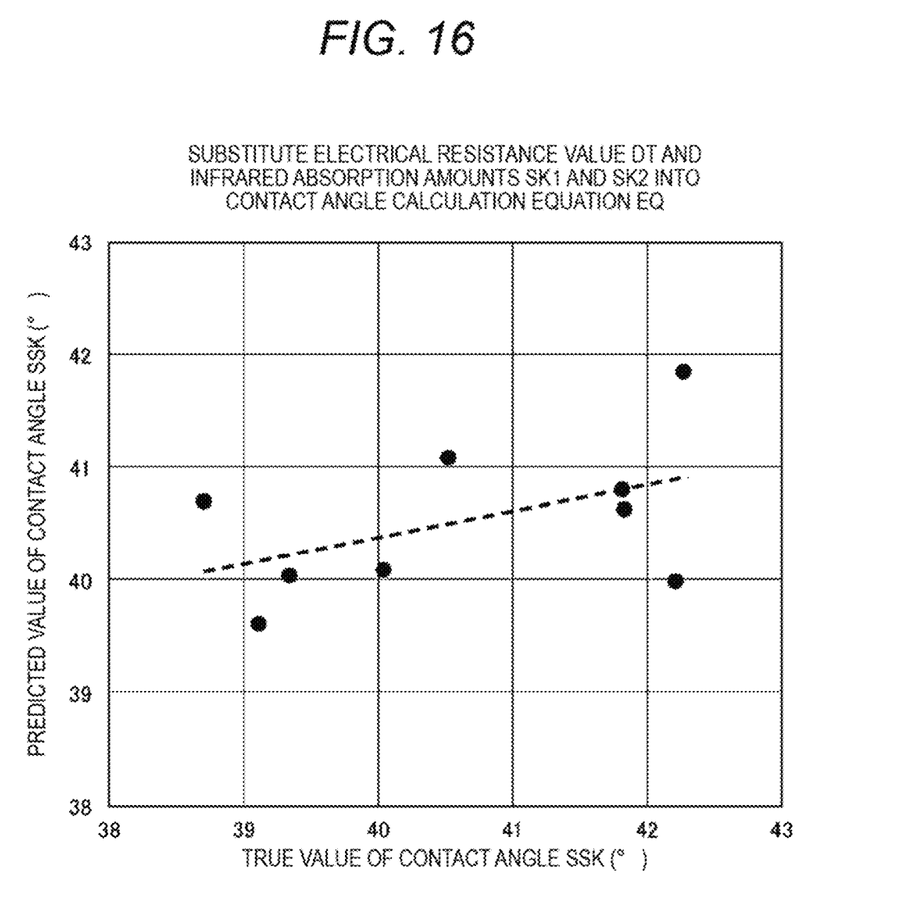
FIG. 16 shows a second relationship between the predicted value and the true value of the contact angle SSK according to the exemplary embodiment.

FIG. 16 shows a second relationship between the predicted value and the true value of the contact angle SSK according to the exemplary embodiment.

Figure 17:
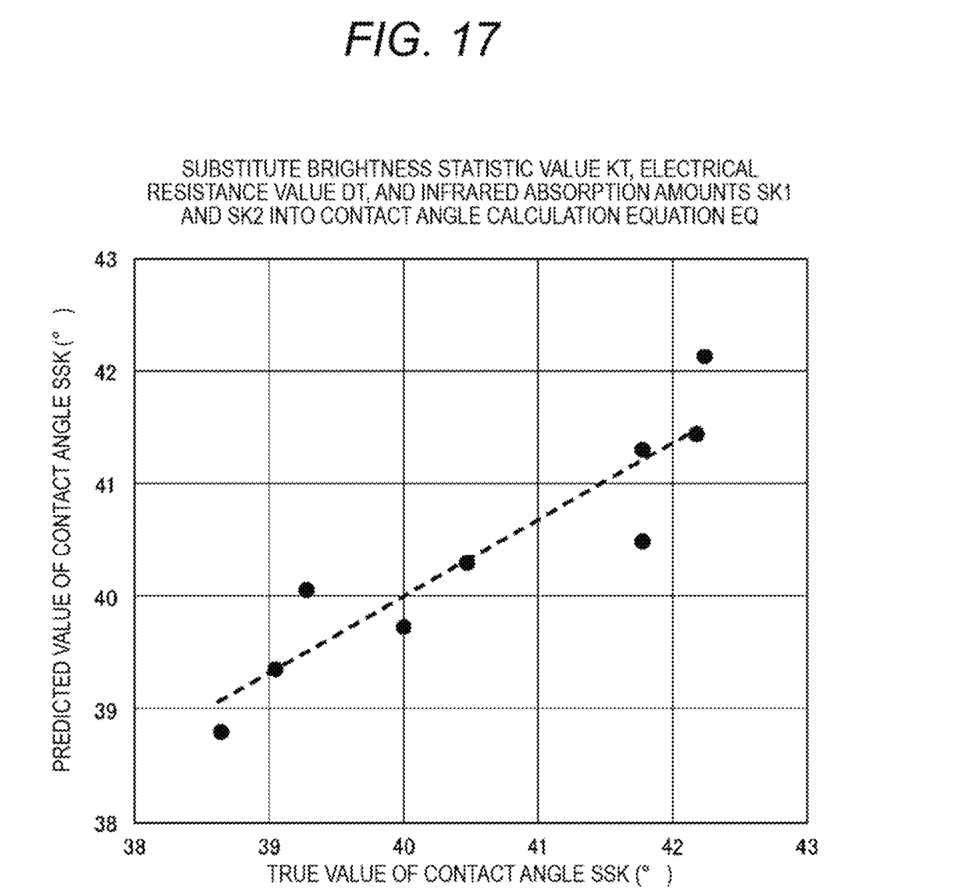
FIG. 17 shows a third relationship between the predicted value and the true value of the contact angle SSK according to the exemplary embodiment.

FIG. 17 shows a third relationship between the predicted value and the true value of the contact angle SSK according to the exemplary embodiment.

The "predicted value of the contact angle SSK" is a value of the contact angle SSK of the printing medium PM obtained by substituting one or more of the brightness statistic KT, the electrical resistance value DT, and the infrared absorption amounts SK1 and SK2 into the above contact angle calculation equation EQ.

The "predicted value of the contact angle SSK" in FIG. 15 is a value of the contact angle SSK of the printing medium PM obtained by substituting only the brightness statistic KT into the above contact angle calculation equation EQ.

The "predicted value of the contact angle SSK" in FIG. 16 is a value of the contact angle SSK of the printing medium PM obtained by substituting the electrical resistance value DT and the infrared absorption amounts SK1 and SK2 into the above contact angle calculation equation EQ.

The "predicted value of the contact angle SSK" in FIG. 17 is a value of the contact angle SSK of the printing medium PM obtained by substituting all of the brightness statistic KT, the electrical resistance value DT, and the infrared absorption amounts SK1 and SK2 into the above contact angle calculation equation EQ.

The "true value of the contact angle SSK" is, for example, an angle formed by the droplet with respect to the surface of the printing medium PM, which is obtained by imaging with a high-resolution and high-speed camera (for example, 0.1 to 0.5 μm/pixel, 10 to 20 μsec/frame).

In FIG. 15 to FIG. 17, the plotted points are points for plural sheets. The plural sheets are specified by parameters. The parameters are, for example, the type of the sheet and the brand of the sheet (manufacturing companies, factories).

The type of the sheet is, for example, gloss coated paper, matte coated paper, or the like. The brand of the sheet is a sheet manufacturing company (for example, a manufacturing company A, a manufacturing company B) and a sheet factory (for example, a factory a1 and a factory a2 owned by the sheet manufacturing company A).

For example, in FIG. 15 to FIG. 17, one sheet (plotted point) is, for example, gloss coated paper, and is shown to be manufactured in the factory a1 of the manufacturing company A. Another different sheet (plotted point) is, for example, gloss coated paper, and is shown to be manufactured in another factory a2 of the manufacturing company A. Yet another different sheet (plotted point) is, for example, gloss coated paper, and is shown to be manufactured in a factory b of the manufacturing company B.

As shown in FIG. 15 to FIG. 17, a straight line may be drawn under the method of least squares between the predicted value of the contact angle SSK and plural plotted points indicating the true value of the contact angle SSK. Therefore, it may be said that regardless of the type of the sheet and the brand of the sheet, there is a linear relationship between the true value of the contact angle SSK of the printing medium PM and the predicted value of the contact angle SSK of the printing medium PM.

In other words, it may be said that the predicted value of the contact angle SSK of the printing medium PM obtained by the above contact angle calculation equation EQ is representative of the true value of the contact angle SSK of the printing medium PM and may be symbolized. That is, without obtaining the true value of the contact angle SSK of the printing medium PM under a large-scale and expensive environment using a laser microscope or the like, the contact angle SSK of the printing medium PM may be estimated by simply substituting the brightness statistic KT, the electrical resistance value DT, and the infared absorption amounts SK1 and SK2 obtained under a small-scale and inexpensive environment, such as the white light emitting diode 31 and the CMOS sensor 32, into the above contact angle calculation equation EQ.

(Modification)

Regarding the substitution into the contact angle calculation equation EQ, for example, (1) the brightness statistic KT and the electrical resistance value DT may be substituted, (2) the brightness statistic KT and the infrared absorption amounts SK1 and SK2 may be substituted, (3) only the electrical resistance value DT may be substituted, and (4) only the infrared absorption amounts SK1 and SK2 may be substituted.

(Supplementary Description of Processor and Program)

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the above exemplary embodiment, instead of being stored (installed) in the storage medium 14 in advance, the program PR may be provided by being recorded in a recording medium such as a compact disc read only memory (CD-ROM), a digital versatile disc read only memory (DVD-ROM), and a universal serial bus (USB) memory, or may be downloaded from an external device via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
a processor, wherein
the processor is configured to
acquire a first characteristic value indicating a shape characteristic of a surface of a medium, and
calculate, based on the first characteristic value, a contact angle of a droplet with respect to the medium.

2. The information processing device according to claim 1, wherein
the processor is configured to
calculate the contact angle of the droplet with respect to the medium based on a brightness statistic, as the first characteristic value, obtained from a diffused light amount image showing an amount of a light reflected by and diffused on the surface of the medium among lights incident on the surface of the medium.

3. The information processing device according to claim 2, wherein
the processor is configured to
calculate, as the brightness statistic, a most frequent brightness value representing a smoothness of the surface of the medium based on a brightness of a plurality of pixels within a unit area in the diffused light amount image.

4. The information processing device according to claim 1, wherein
the processor is configured to
acquire a second characteristic value indicating a physical characteristic of the surface of the medium, and
calculate the contact angle based on at least one of the first characteristic value and the second characteristic value.

5. The information processing device according to claim 2, wherein
the processor is configured to
acquire a second characteristic value indicating a physical characteristic of the surface of the medium, and
calculate the contact angle based on at least one of the first characteristic value and the second characteristic value.

6. The information processing device according to claim 3, wherein
the processor is configured to
acquire a second characteristic value indicating a physical characteristic of the surface of the medium, and
calculate the contact angle based on at least one of the first characteristic value and the second characteristic value.

7. The information processing device according to claim 4, wherein
the processor is configured to
acquire, as the second characteristic value, an electrical resistance value on the surface of the medium.

8. The information processing device according to claim 5, wherein
the processor is configured to
acquire, as the second characteristic value, an electrical resistance value on the surface of the medium.

9. The information processing device according to claim 6, wherein
the processor is configured to
acquire, as the second characteristic value, an electrical resistance value on the surface of the medium.

10. The information processing device according to claim 4, wherein
the processor is configured to
acquire, as the second characteristic value, an amount of an absorbed infrared light among an amount of infrared lights received by the surface of the medium.

11. The information processing device according to claim 5, wherein
the processor is configured to
acquire, as the second characteristic value, an amount of an absorbed infrared light among an amount of infrared lights received by the surface of the medium.

12. The information processing device according to claim 6, wherein
the processor is configured to
acquire, as the second characteristic value, an amount of an absorbed infrared light among an amount of infrared lights received by the surface of the medium.

13. The information processing device according to claim 4, wherein
the processor is configured to
acquire, as the second characteristic value, both an electrical resistance value on the surface of the medium and an amount of an absorbed infrared light among an amount of infrared lights received by the surface of the medium.

14. The information processing device according to claim 5, wherein
the processor is configured to
acquire, as the second characteristic value, both an electrical resistance value on the surface of the medium and an amount of an absorbed infrared light among an amount of infrared lights received by the surface of the medium.

15. The information processing device according to claim 6, wherein
the processor is configured to
acquire, as the second characteristic value, both an electrical resistance value on the surface of the medium and an amount of an absorbed infrared light among an amount of infrared lights received by the surface of the medium.

16. A non-transitory computer readable medium storing a program causing a computer to execute a process for information processing, the process comprising:
acquiring a first characteristic value indicating a shape characteristic of a surface of a medium, and
calculating, based on the first characteristic value, a contact angle of a droplet with respect to the medium.

* * * * *

UNITED STATES PATENT AND TRADEMARK OFFICE
CERTIFICATE OF CORRECTION

| | |
|---|---|
| PATENT NO. | : 11,489,975 B2 |
| APPLICATION NO. | : 16/942884 |
| DATED | : November 1, 2022 |
| INVENTOR(S) | : Masao Omori et al. |

It is certified that error appears in the above-identified patent and that said Letters Patent is hereby corrected as shown below:

On the Title Page

Item (73) Assignee: "FUJIFIIM Business Innovation Corp." should read -- FUJIFILM Business Innovation Corp. --

Signed and Sealed this
Twentieth Day of December, 2022

Katherine Kelly Vidal
*Director of the United States Patent and Trademark Office*